(12) United States Patent
Van Steijn et al.

(10) Patent No.: US 12,144,359 B2
(45) Date of Patent: Nov. 19, 2024

(54) SYSTEM AND METHOD FOR AUTOMATICALLY SUSPENDING POULTRY FROM A CARRIER OF A CARRIER CONVEYOR

(71) Applicant: Meyn Food Processing Technology B.V., Oostzaan (NL)

(72) Inventors: Aloysius Christianus Van Steijn, Oostzaan (NL); Rick Sebastiaan Van Stralen, Oostzaan (NL); René Gerardus Hendricus Al, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 26 days.

(21) Appl. No.: 18/137,526

(22) Filed: Apr. 21, 2023

(65) Prior Publication Data
US 2023/0337688 A1 Oct. 26, 2023

(30) Foreign Application Priority Data
Apr. 22, 2022 (NL) .................................... 2031668

(51) Int. Cl.
*A22C 21/00* (2006.01)
(52) U.S. Cl.
CPC ...... *A22C 21/0053* (2013.01); *A22C 21/0046* (2013.01)
(58) Field of Classification Search
CPC ............ A22C 21/0053; A22C 21/0046; A22C 21/0073; A22C 21/0093
USPC .......................................................... 452/177
See application file for complete search history.

(56) References Cited

U.S. PATENT DOCUMENTS

| | | | |
|---|---|---|---|
| 5,370,574 A * | 12/1994 | Meyn ................... | A01K 45/005 452/53 |
| 10,881,115 B1 | 1/2021 | Inscho, Jr. | |
| 2011/0136422 A1* | 6/2011 | McMurray ......... | A22C 21/0053 452/182 |
| 2015/0245628 A1* | 9/2015 | Ostergaard ......... | A22C 21/0053 452/179 |
| 2020/0254641 A1* | 8/2020 | Hocker ................ | B26D 7/1863 |

FOREIGN PATENT DOCUMENTS

WO WO 2014/040604 A1 3/2014
WO WO 2020/126893 A2 6/2020

OTHER PUBLICATIONS

NL Search Report, Jan. 19, 2023.

\* cited by examiner

*Primary Examiner* — Richard T Price, Jr.
(74) *Attorney, Agent, or Firm* — Dority & Manning, P.A.

(57) ABSTRACT

A system and method for automatically suspending poultry from a carrier of a carrier conveyor. A vision guided robot can pick up poultry from a feedline and suspend the poultry from the carrier. An imaging device can be connected to a decision-making tool to process images from the poultry on the feedline, wherein the decision-making tool is arranged to detect a head of the poultry and to control the vision guided robot to pick up the poultry from the feedline by engaging the poultry at or below the head, and to subsequently suspend the poultry with its head up from the carrier of the carrier conveyor.

20 Claims, 5 Drawing Sheets

SYSTEM AND METHOD FOR AUTOMATICALLY SUSPENDING POULTRY FROM A CARRIER OF A CARRIER CONVEYOR

PRIORITY STATEMENT

The present application claims priority under 35 U.S.C. § 119 to Dutch patent application No. 2031668, filed on Apr. 22, 2022.

FIELD OF THE INVENTION

The subject matter of the present disclosure relates to a system and method for automatically suspending poultry from a carrier of a carrier conveyor.

BACKGROUND OF THE INVENTION

WO2014/040604 discloses an apparatus for suspending birds having body, neck, legs and possibly head and feet from an overhead conveyor, and includes:
- a plurality of holders each having a neck end adapted from receiving the neck of a bird and a first opening from which the legs and/or feet of the bird may project,
- a monitoring station for determining orientation of the legs and/or feet of each bird, and
- a rotation station for rotating the bird about an axis of rotation extending between a plane defined by the first opening of the holder and a plane defined by the neck end of the holder.

With the apparatus of WO2014/040604 a method can be applied for suspending birds having body, neck, legs and possibly head and feet from an overhead conveyor, that includes the following sequence of steps:
- A) each bird is arranged in a holder with its legs and/or feet projecting from a first opening therein and its neck at a neck end of the holder,
- B) orientation of the legs and/or feet is determined,
- C) the bird is rotated about an axis of rotation extending between a plane defined by the first opening of the holder and a plane defined by the neck end of holder until a predetermined orientation of the legs and/or feet is reached, and
- D) the legs and/or feet of the bird are arranged in a shackle on the conveyor.

WO2020/126893 teaches that it is common in the field of pig abattoirs to suspend pieces of meat on a specific transporting means, usually termed a "Christmas tree", for internal or external transport and/or storage. This Christmas tree essentially consists of a number of hooks, mounted on a vertical rod, which rod is configured to be suspended from an overhanging rail or to be mounted on a stand, and makes up a means for collecting and transporting the meat items. At pig abattoirs, and when dealing with the processing of e.g., fore-ends and bellies of pork, it is customary to sort these meat items into different weight classes, which necessitates division of the starting products into different product lines (waiting spaces) for storage and awaiting the further processing.

WO2020/126893 proposes a system and process in order to avoid the manual hard work associated with suspending large and heavy pig meat pieces, e.g., on racks for storage and/or transport of goods. Accordingly, WO2020/126893 teaches a pig meat handling system, configured for moving and suspending one or more pig meat items from an inlet conveyor to a means for storage and/or transport of the pig meat items. The system includes:
- one or more processing means;
- an inlet conveyor belt for transporting and providing the meat items to an arrival area;
- a sensor, installed at, or within operating distance of the arrival area, for detecting the arrival of the pig meat items at the arrival area;
- the processing means being in operation with the inlet conveyor belt, the sensor, and with one or more industrial robots, and/or the storage/transporting means,
- means for turning a rod, for determining the exact localisation of the arriving pig meat item, for determining the localisation of a suitable gripping point on the pig meat item;
- a gripping tool mounted on the industrial robot, capable of picking, grabbing, clamping or holding the arriving pig meat item while in motion, and lifting it up from the conveyor, so it can finally be hung on the means for storage/transport;

The storage/transporting means includes a number of hooks, with the tip facing upwards, for receiving the pig meat items to be stored/transported, and which hooks are mounted on a vertical rod, which rod is operatively connected to a means for turning the rod, so as to bring the hook into a certain position for receiving the pig meat item, delivered by the gripping tool mounted on the industrial robot.

U.S. Pat. No. 10,881,115 B1 discloses a system and method for automatically suspending poultry from a carrier of a carrier conveyor, including a feedline for the poultry to be suspended, wherein the system includes an imaging device connected to a decision-making tool to process images from the poultry on the feedline, the images being received from the imaging device, and a vision guided robot for picking up the poultry from the feedline and to suspend the poultry from the carrier of the carrier conveyor, wherein the system is provided with a poultry orientation determination system, an orienting system for the poultry, an orienting pass fail system and a poultry shackling system whereby poultry is robotically inserted into a poultry shackle using a plurality of vision guided robots in series and a tool that has a three axis capability of rotation and a contour to match the contour of a poultry breast.

A large disadvantage of this known system and method for automatically suspending poultry from a carrier of a carrier conveyor is that it requires much equipment for its implementation, which makes it expensive and complicated and prone to failure.

BRIEF DESCRIPTION OF THE INVENTION

Aspects and advantages of the invention will be set forth in part in the following description, or may be obvious from the description, or may be learned through practice of the invention.

In one exemplary aspect, it is an object of the invention to reduce expenses, to improve reliability and make the system and its method of operation simpler and less complicated.

According to an exemplary embodiment of the invention, a system and method are proposed in accordance with the appended claims, which also cover a computer, computer program, and computer readable medium provided with such computer program in support of the exemplary method and system of the invention.

According to another exemplary embodiment of the invention, a system for automatically suspending poultry from a carrier of a carrier conveyor includes a decision-making tool arranged to detect a head of the poultry and to control the vision guided robot to pick up the poultry from the feedline by engaging the poultry at or below the head, such as at the neck, and subsequently suspend the poultry with its head up from the carrier of the carrier conveyor. The poultry may be suspended by the head from the carrier. This exemplary embodiment can avoid the complicated pass fail orientation system required in the system and method of the prior art, without compromising but even by improving the reliability that is achieved in the process of picking up the poultry from the feedline and thereafter suspending the poultry by the head in a conveyor line.

In another exemplary aspect, the present invention provides a method that includes:

taking images from the poultry on a feedline;
processing the images to detect a head of the poultry;
controlling a vision guided robot to pick up the poultry from the feedline by engaging the poultry at or below the head, and
controlling the vision guided robot to suspend the poultry with its head up from the carrier of the carrier conveyor. The wording "with its head up" reflects that there are a couple of options in which the poultry may be suspended from the carrier, notably by engaging the poultry at the neck below the head, or by engaging the poultry such that it will be suspended by the head.

Although this is not necessarily the only way of implementation, in one exemplary aspect, at least the processing of images of the poultry and/or the controlling the vision guided robot is implemented with the use of a computer. Correspondingly the invention in certain embodiments is also embodied in a computer program which when loaded in the computer arranges that the computer supports the exemplary system of the invention and its method of operation. Exemplary aspects of the invention also include a computer readable medium provided with the exemplary computer program of the invention.

To enable processing poultry in large quantities and at a high rate, in another exemplary aspect the feedline is equipped with a supply station to release a plurality of poultry in a non-organized order to the feedline. It is of course also possible that the feedline receives the poultry in an organized order, which may reduce the burden of afterwards properly orienting the poultry after the poultry is picked up from the feedline by the vision controlled robot and before the vision controlled robot has suspended the poultry from the appropriate carrier of the carrier conveyor.

The supply station is equipped to receive the poultry one by one, or in containers, such as crates.

Desirably the supply station is equipped to release the poultry from the containers so that they move into and through a transfer portion towards the feedline, wherein the transfer portion is equipped with guiding channels to provide the poultry to the feedline in separate lines or moving queues of poultry. This promotes that the poultry in separate neighbouring lines will not touch each other, which makes imaging of individual birds more easy, and also helps in picking up poultry from the feedline by the vision guided robot. In one exemplary aspect, it may be preferred that eventually neighbouring poultry on the feedline will not touch each other.

It is a beneficial feature of exemplary embodiment of the invention that the decision-making tool controls the vision guided robot to engage and pick up the poultry from the feedline in an arbitrary orientation, which is particularly beneficial because of the nonorganized order in which the supply station may release the poultry to the feedline. Thereafter the decision-making tool can control the vision guided robot to position the picked up poultry in a predetermined orientation in which predetermined orientation the vision guided robot suspends the poultry with its head up from the carrier of the carrier conveyor.

It is therefore desirable, in certain exemplary aspects, to collect images of the poultry whilst the vision guided robot has picked up the poultry from the feedline, such as when the poultry is hanging from the vision guided robot, and to further control the vision guided robot to position the picked up poultry into the predetermined orientation, based on the images of the poultry hanging from the vision guided robot. Accordingly, exemplary aspects of the system can be provided with the feature that the decision-making tool controls the vision guided robot to position the picked up poultry into the predetermined orientation based on images of the poultry, which images are provided by the imaging device.

The reliability of the control of the vision guided robot can be improved by arranging that the imaging device is mounted on the vision guided robot. This is however not essential, the imaging device may also be a standalone device next to the vision guided robot.

Exemplary embodiments of the system of the invention can make it possible to maneuverer the poultry in any desired orientation, however the predetermined orientation of the poultry may be one wherein the poultry breast faces the carrier or one wherein the poultry breast faces away from the carrier. For all practical purposes these options can accommodate the majority of situations in poultry processing plants. One thing and another is preferably achieved by arranging that the decision-making tool selects the predetermined orientation of the poultry depending on the type of the carrier conveyor in which the poultry will or is to be suspended for certain exemplary embodiments.

In certain exemplary embodiments, it may be preferred that the decision-making tool is arranged to control the vision guided robot such that the poultry will be picked up and suspended from the carrier with the breast facing the carrier. This in particular applies to buffer stations.

These and other features, aspects and advantages of the present invention will become better understood with reference to the following description and appended claims. The accompanying drawings, which care incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Whenever in the figures the same reference numerals are applied, these numerals refer to the same parts.

DETAILED DESCRIPTION

Figure 1:
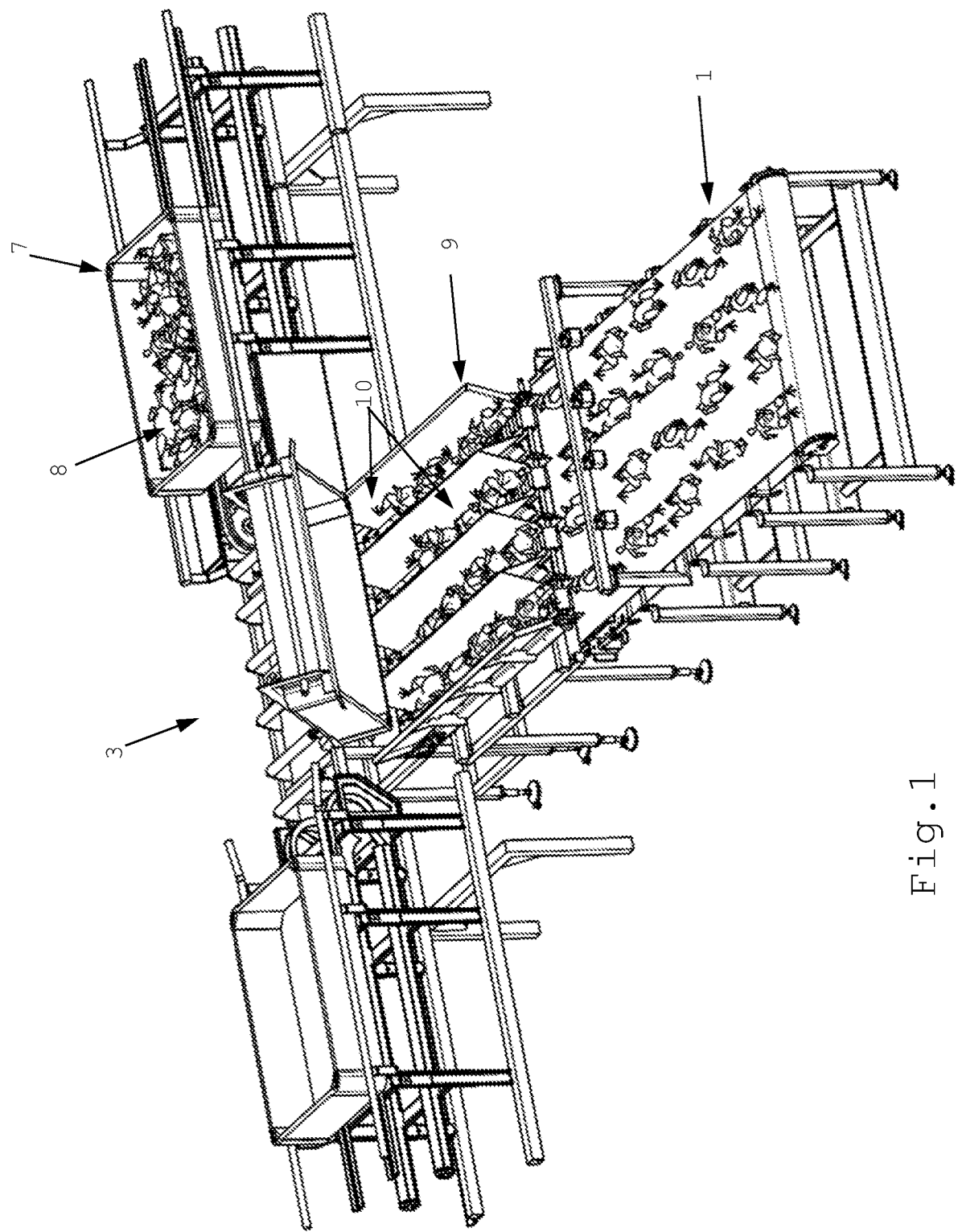
FIG. 1 shows a supply station and a feedline forming part of a system according to an exemplary embodiment of the invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, the term "or" is generally intended to be inclusive (i.e., "A or B" is intended to mean "A or B or both").

In an one exemplary embedment of the invention, a system and method for automatically suspending poultry from a carrier of a carrier conveyor are provided. The system may include a feedline 1 for the poultry 8, which is shown in FIG. 1 together with a supply station 3 for the poultry. Further the system can include a vision guided robot 4 and the carrier conveyor 5, which are both shown in FIGS. 2 through 5. The carrier conveyor 5 can include a series of carriers 6, only a couple of which are shown, which are movable in the conveying direction of the carrier conveyor 5 in a manner that is entirely known to the skilled person and therefore requires no further elucidation.

The feedline 1 receives the poultry 8 from the supply station 3, which receives the poultry 8 one by one, or in containers 7, such as crates, and releases the poultry 8 from the containers 7 to the feedline 1. The supply station 3 is equipped with a transfer portion 9 towards the feedline 1. When the poultry 8 is released from the containers 7, the poultry will pass the transfer portion 9 and move to the feedline 1. The transfer portion 9 can be equipped with guiding channels 10 to provide the poultry 8 to the feedline 1 in separate lines or moving queues of poultry. Preferably the neighbouring poultry 8 received on the feedline 1 does not touch each other.

Figure 2:
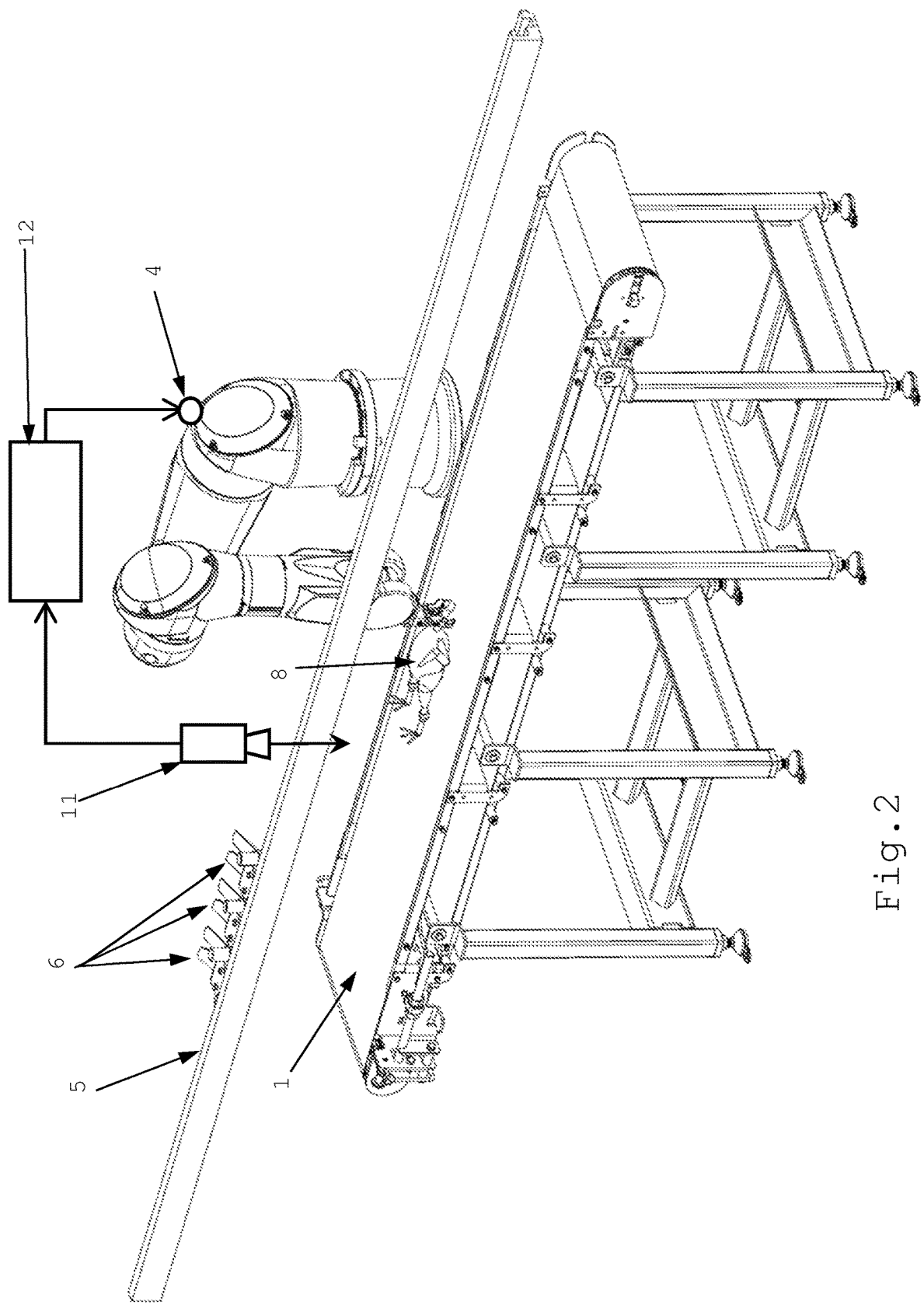
FIG. 2 and FIG. 3 show the exemplary system of the invention with an exemplary feedline, a vision guided robot, and a carrier conveyor, wherein the poultry is supplied in a first orientation on the feedline.
Figure 3:
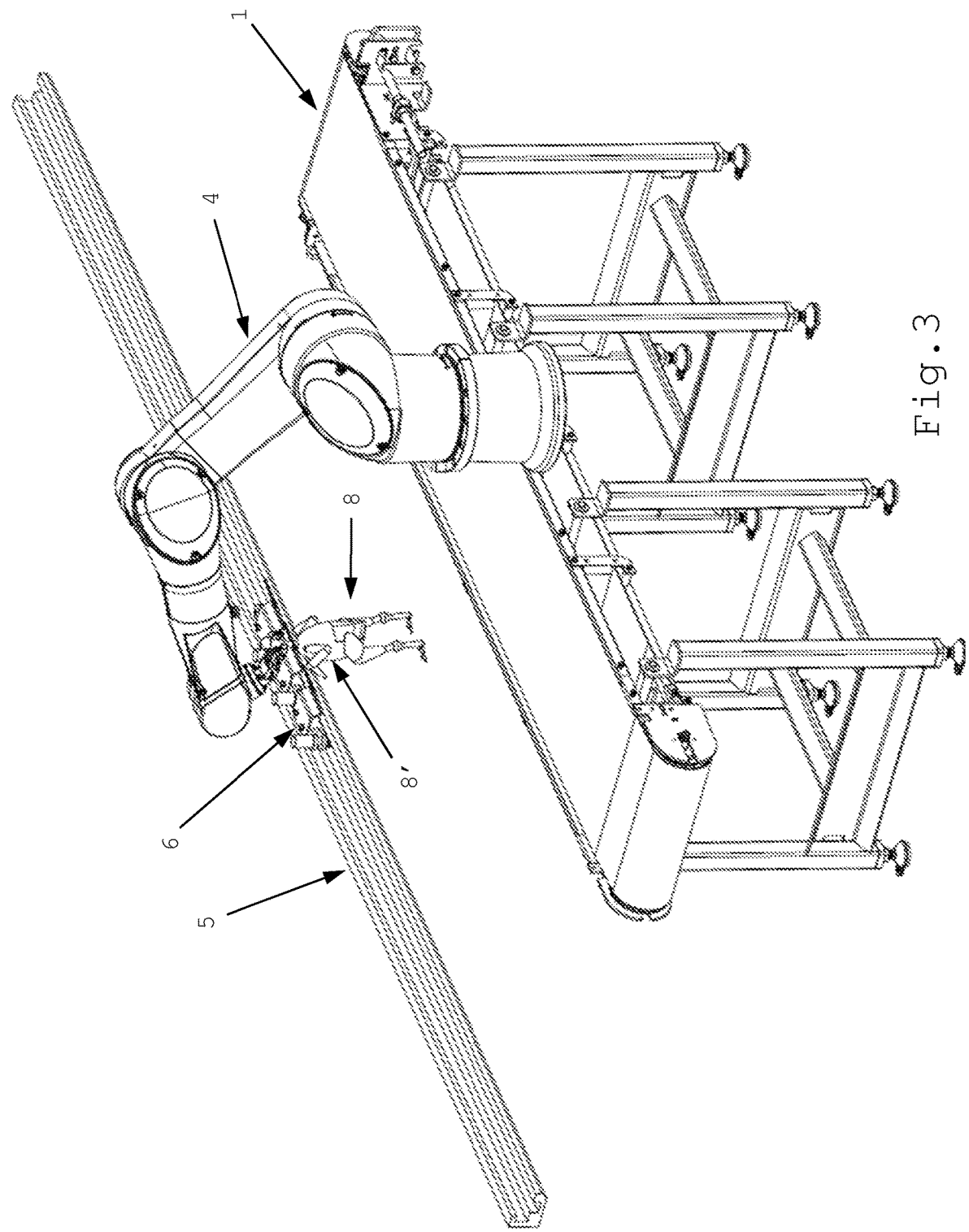
Figure 4:
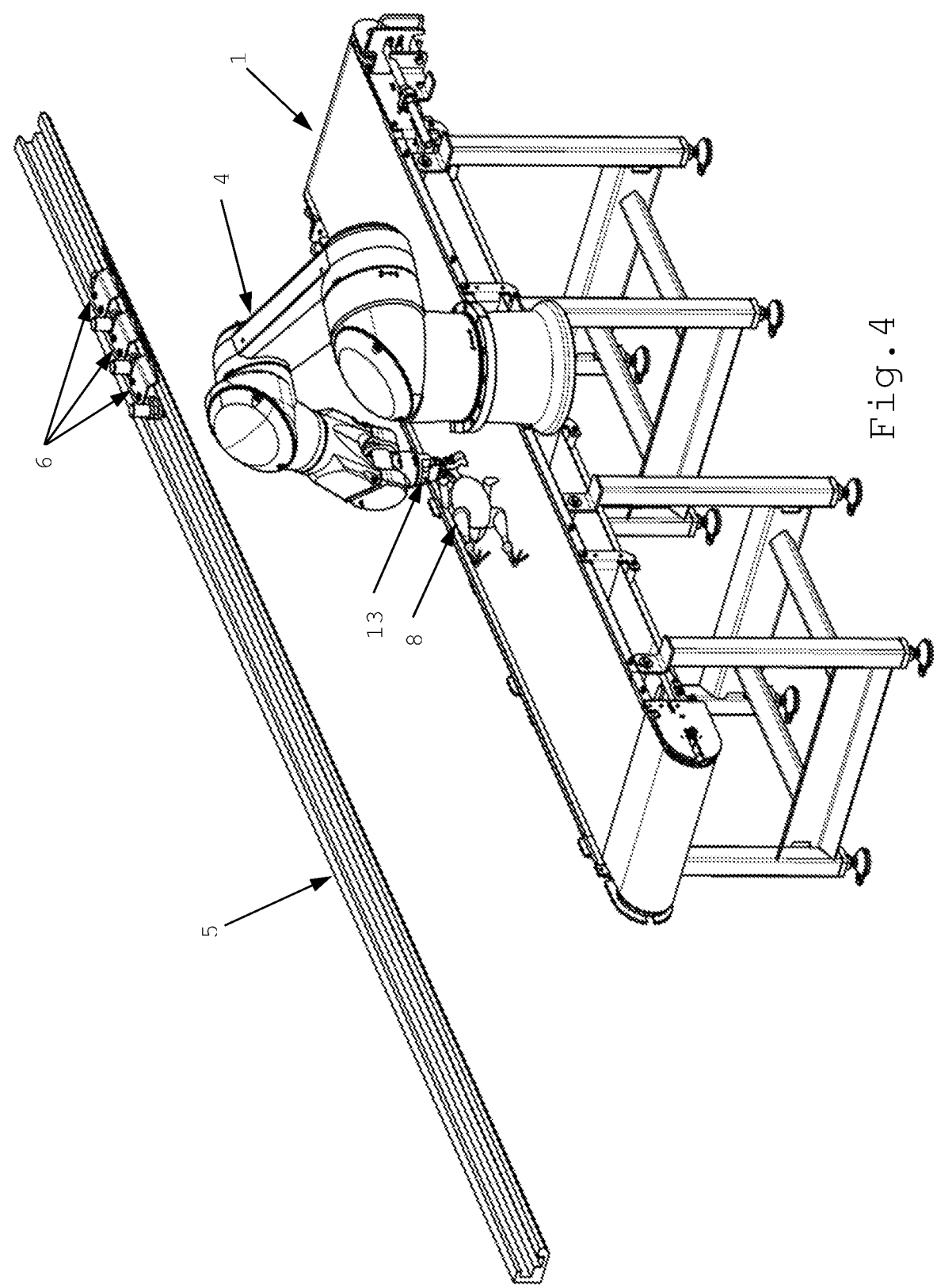
FIG. 4 and FIG. 5 show the exemplary system of the invention with a feedline, a vision guided robot, and a carrier conveyor, wherein the poultry is supplied in a second orientation on the feedline.

For clarity reasons, FIGS. 2 through 5 only show the feedline 1, wherein FIGS. 2 and 4 show that the poultry 8 is supplied with the feedline 1 towards a vision guided robot 4. The difference between FIG. 2 and FIG. 4 is that FIG. 2 shows a single poultry lying with the back on the feedline 1, whereas FIG. 4 shows that the single poultry lies with its side resting on the feedline 1. By providing FIGS. 2 and 4 it is shown that the vision guided robot 4 picks up the poultry from the feedline 1, without differentiating between the position of the poultry 8 lying on the feedline 1. This is realized by arranging that the system comprises an imaging device 11 connected to a decision-making tool 12 to process images from the poultry 8 received from the imaging device 11, wherein the decision-making tool 12 is arranged to detect a head of the poultry 8. This is only shown in FIG. 2, but this correspondingly applies to FIGS. 3 through 5 as well. It is noted that the imaging device 11 is shown as a standalone device next to the vision guided robot 4, but this is not the only option. The imaging device can also be mounted on the vision guided robot 4 as will be referred to hereinafter.

FIGS. 2 and 4 show the initial moves of a subsequent method step that follows after the detection of the head of the poultry 8. In such a subsequent method step the decision-making tool 12 controls the vision guided robot 4 to pick up the poultry 8 from the feedline 1 by engaging the poultry 8 at or below the detected head. The poultry 8 will then be hanging from the vision guided robot 4 in an arbitrary orientation. Thereafter the decision-making tool 12 controls the vision guided robot 4 to execute the following moves of the subsequent method step wherein the poultry 8 is eventually suspended with its head up from the carrier 6 of the carrier conveyor 5.

Before the final step is executed wherein the poultry 8 will be suspended with its head up in the carrier 6 of the carrier conveyor 5, the poultry 8 is maneuvered by the vision guided robot 4 into a predetermined orientation. For that purpose of moving the poultry into the predetermined orientation, the decision-making tool 12 controls the vision guided robot 4 to move the picked up poultry 8 based on images of the poultry 8 as it is hanging from the vision guided robot 4, which images are derived from the imaging device 11. It is indeed possible to use the same imaging device 11 as is used for imaging the poultry 8 when lying on the feedline 1, but in many exemplary embodiments it is then required that the imaging device 11 is provided with a tracking feature to follow the poultry 8 after it has been picked up by the vision guided robot 4. Another option is to use a further imaging device 13, which is then preferably mounted on the vision guided robot 4, which is best shown in FIG. 4.

Figure 5:
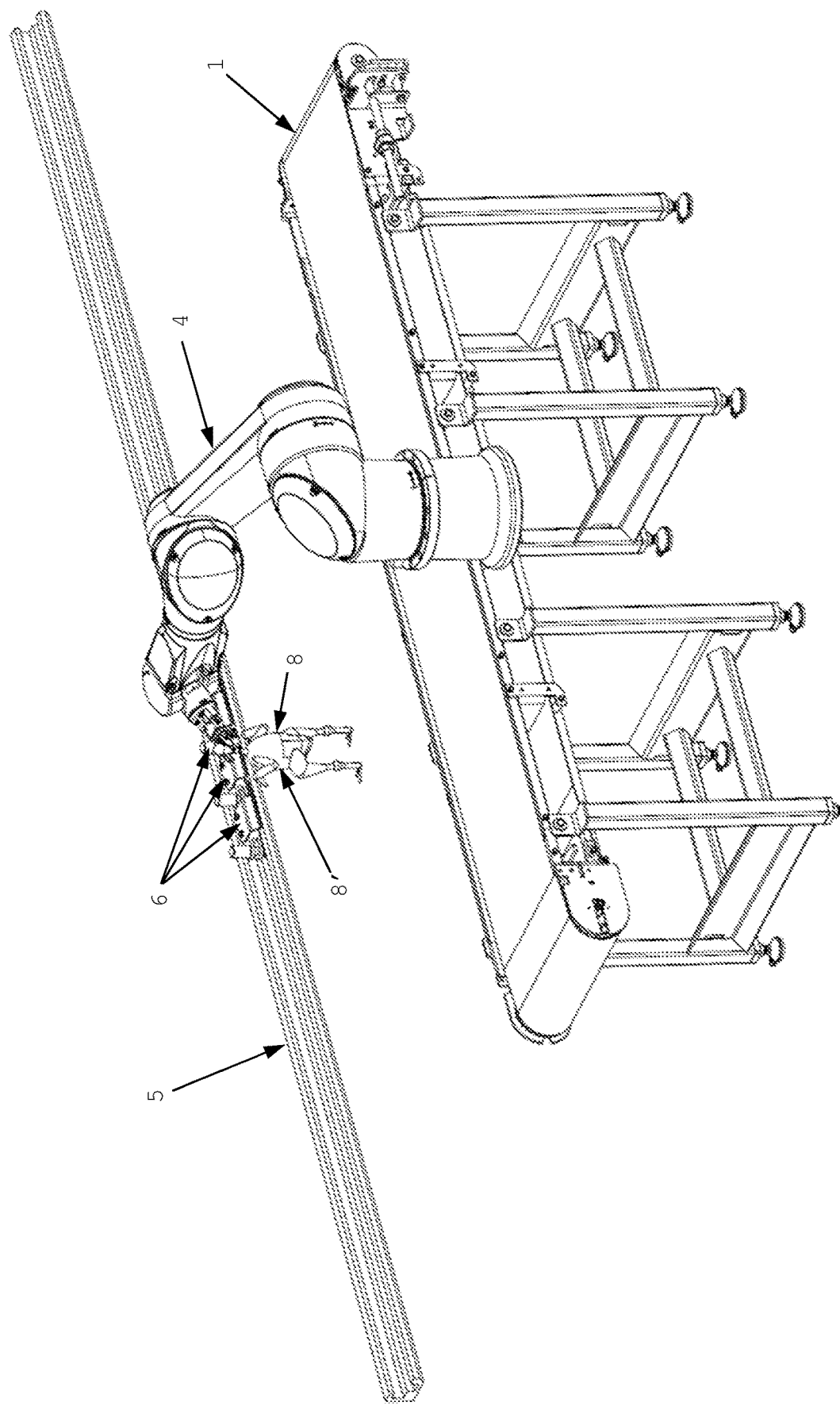

Although many orientations are feasible wherein the poultry 8 can be moved with the vision guided robot 4, it is preferred in certain exemplary embodiments that the predetermined orientation of the poultry is one of the poultry breast 8' facing the carrier 6 and the poultry breast 8' facing away from the carrier 6. Both FIG. 3 and FIG. 5 show the option that the poultry breast 8' is facing the carrier 6, which is most commonly the desired orientation, and in particular when the carrier conveyor 5 is part of a buffer station. The decision-making tool 12 is arranged to select the predetermined orientation of the poultry 8 depending on the type of the carrier conveyor 5 in which the poultry 8 will or is to be suspended.

Embodiments of the present invention can include every combination of features that are disclosed herein independently from each other. Although the invention has been discussed in the foregoing with reference to an exemplary embodiment of the method of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Variations and modifications of the present invention will be obvious to those skilled in the art and it is intended to cover in the appended claims all such modifications and equivalents. Unless specifically stated as being "essential" above, none of the various components or the interrelationship thereof are essential to the operation of the invention. Rather, desirable results can be achieved by substituting various components and/or reconfiguration of their relationships with one another.

Optionally, exemplary embodiments of the present invention can include a general or specific purpose computer or distributed system programmed with computer software implementing steps described above, which computer software may be in any appropriate computer language, including but not limited to C++, FORTRAN, ALGOL, BASIC, Java, Python, Linux, assembly language, microcode, distributed programming languages, etc. The exemplary apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

The invention claimed is:

1. A system for automatically suspending poultry from a carrier of a carrier conveyor, comprising a feedline for the poultry to be suspended, wherein the system
    an imaging device connected to a decision-making tool to process images from the poultry suspended on a feedline, the images being received from the imaging device; and
    a vision guided robot for picking up the poultry from the feedline and suspending the poultry from the carrier of the carrier conveyor;
    wherein the decision-making tool is arranged to detect a head of the poultry and to control the vision guided robot to pick up the poultry from the feedline by engaging the poultry at or below the head, and subsequently suspend the poultry with its head up from the carrier of the carrier conveyor.

2. The system of claim 1, further comprising a supply station to release a plurality of poultry in a non-organized order to the feedline that is equipped with the supply station.

3. The system of claim 2, wherein the supply station is equipped to receive the poultry one by one, or in containers.

4. The system of claim 2, wherein the supply station is equipped to release the poultry from the containers into and through a transfer portion to the feedline, wherein the transfer portion is equipped with guiding channels to provide the poultry to the feedline in separate lines or moving queues of poultry, preferably without neighbouring poultry received on the feedline touching each other.

5. The system of claim 1, wherein the decision-making tool controls the vision guided robot to engage and pick up the poultry from the feedline in an arbitrary orientation.

6. The system of claim 1, wherein the decision-making tool controls the vision guided robot to position the picked up poultry into a predetermined orientation, in which predetermined orientation the vision guided robot suspends the poultry with its head up from the carrier of the carrier conveyor.

7. The system of claim 1, wherein the decision-making tool controls the vision guided robot to place the picked up poultry into a predetermined orientation based on images of the poultry after it has been picked up by the vision guided robot, which images are derived from the imaging device.

8. The system of claim 1, wherein the imaging device is mounted on the vision guided robot.

9. The system of claim 1, wherein the predetermined orientation of the poultry is one of the poultry breast facing the carrier and the poultry breast facing away from the carrier.

10. The system of claim 9, wherein the orientation of the breast is determined by detecting a characteristic feature of the poultry, such as a beak of the poultry.

11. The system of claim 10, wherein the decision-making tool is arranged to select the predetermined orientation of the poultry depending on the type of the carrier conveyor in which the poultry will or is to be suspended.

12. A method for automatically suspending poultry from a carrier of a carrier conveyor, comprising:
    providing poultry in a feedline towards a vision guided robot;
    picking up the poultry from the feedline with the vision guided robot;
    suspending the poultry with the vision guided robot from the carrier of the carrier conveyor;
    taking images from the poultry on the feedline;
    processing the images to detect a head of the poultry;
    controlling the vision guided robot to pick up the poultry from the feedline by engaging the poultry at or below the head; and
    controlling the vision guided robot to suspend the poultry with its head up from the carrier of the carrier conveyor.

13. The method of claim 12, further comprising supplying a plurality of poultry to the feedline in a non-organized order.

14. The method of claim 12, further comprising controlling the vision guided robot to engage and pick up the poultry from the feedline in an arbitrary orientation.

15. The method of claim 14, further comprising controlling the vision guided robot to position the picked up poultry into a predetermined orientation, and controlling the vision guided robot to suspend the poultry with the head up from the carrier of the carrier conveyor in the predetermined orientation.

16. The method of claim 15, further comprising collecting images of the poultry while the vision guided robot has picked up the poultry from the feedline, and further controlling the vision guided robot to position the picked up poultry into the predetermined orientation, based on the images of the poultry being picked up by the vision guided robot.

17. The method of claim 12, further comprising controlling the vision guided robot to move the poultry in a predetermined orientation selected from the group comprising a first orientation of the poultry with the breast facing the carrier and a second orientation with the poultry breast facing away from the carrier.

18. The method of claim 12, wherein at least one of the steps of processing of images of the poultry and controlling the vision guided robot is implemented in a computer.

19. A computer program which when loaded in a computer forming part of a system according to any one of claims 1 through 11, arranges that the computer causes that the method of any one of claims 12 through 17 is carried out.

20. A computer readable medium provided with the computer program of claim 19.

* * * * *